US009982655B2

(12) United States Patent
Behrens

(10) Patent No.: US 9,982,655 B2
(45) Date of Patent: *May 29, 2018

(54) ROTOR AND FLUID TURBINE WITH ROTOR

(71) Applicant: CASSIUS ADVISORS GMBH, Münster (DE)

(72) Inventor: Michael Behrens, Münster (DE)

(73) Assignee: WINDTREE GMBH, Stralsund (DE)

(*) Notice: Subject to any disclaimer, the term of this patent is extended or adjusted under 35 U.S.C. 154(b) by 305 days.

This patent is subject to a terminal disclaimer.

(21) Appl. No.: 14/677,284

(22) Filed: Apr. 2, 2015

(65) Prior Publication Data
US 2015/0285219 A1 Oct. 8, 2015

Related U.S. Application Data

(60) Provisional application No. 61/974,540, filed on Apr. 3, 2014.

(51) Int. Cl.
F03B 11/02 (2006.01)
F03D 3/06 (2006.01)
F03D 3/00 (2006.01)
F03B 3/12 (2006.01)
F03B 3/18 (2006.01)
(Continued)

(52) U.S. Cl.
CPC .............. F03D 3/062 (2013.01); F03B 3/121 (2013.01); F03B 3/18 (2013.01); F03B 11/02 (2013.01); F03D 3/005 (2013.01); F03D 3/0409 (2013.01); F03D 13/20 (2016.05); F05B 2210/16 (2013.01); Y02E 10/223 (2013.01);
(Continued)

(58) Field of Classification Search
CPC .......... F03D 3/062; F03D 13/20; F03D 3/005; F03D 3/0409; F03B 3/121; F03B 3/18; F03B 11/02; F05B 2210/16; Y02E 10/223; Y02E 10/226; Y02E 10/728; Y02E 10/74
USPC ..................................................... 416/197 R
See application file for complete search history.

(56) References Cited

U.S. PATENT DOCUMENTS 252,947 A 1/1882 Jones
4,362,470 A * 12/1982 Locastro ................. F03D 3/061
416/197 A
(Continued)

FOREIGN PATENT DOCUMENTS

CN 101907059 A 12/2010
DE 3636781 A1 5/1988
(Continued)

Primary Examiner — Aaron R Eastman
(74) Attorney, Agent, or Firm — Hudak, Shunk & Farine Co. LPA

(57) ABSTRACT

A rotor 16 is provided, comprising a vertical rotation axis 12, and at least two rotor blades 18, 20, 22 arranged on the rotation axis 12, wherein at least one rotor blade 18, 20, 22 comprises a curved first portion 40, wherein the first portion 40 has a concave side 42 and a convex side 44, wherein a curved second portion 50 is arranged on the end 46 of the first portion 40 of the rotor blade 18, 20, 22 facing away from the rotation axis 12. The second portion 50 has a concave side 52 and a convex side 54, and the two portions 40, 50 are arranged in such a manner that, in the radial direction, the convex side 44 of the first portion 40 is followed by the concave side 52 of the second portion 50. Due to the design of the rotor blade 18, 20, 22, the rotor 16 has particularly high efficiency.

20 Claims, 10 Drawing Sheets

(51) Int. Cl.
*F03D 3/04* (2006.01)
*F03D 13/20* (2016.01)

(52) U.S. Cl.
CPC ........... *Y02E 10/226* (2013.01); *Y02E 10/728* (2013.01); *Y02E 10/74* (2013.01)

(56) References Cited

U.S. PATENT DOCUMENTS

| | | | |
|---|---|---|---|
| 5,076,759 A | 12/1991 | Schönell | |
| 6,147,415 A * | 11/2000 | Fukada | F03D 3/0427 290/54 |
| 6,808,366 B2 * | 10/2004 | Sikes | F03D 3/02 415/60 |
| 8,864,440 B2 * | 10/2014 | Sauer, Jr. | F03D 3/065 415/4.2 |
| 2003/0133782 A1 | 7/2003 | Holter et al. | |
| 2005/0201855 A1 * | 9/2005 | Fan | F03D 3/002 415/4.1 |
| 2006/0140765 A1 | 6/2006 | Shih | |
| 2007/0086895 A1 * | 4/2007 | Vanderhye | F03D 3/062 416/197 A |
| 2009/0246027 A1 * | 10/2009 | Johnson | F03D 3/005 416/197 A |
| 2012/0070282 A1 | 3/2012 | Khan, Sr. et al. | |
| 2013/0323056 A1 | 12/2013 | Su | |
| 2015/0285208 A1 * | 10/2015 | Behrens | F03D 3/0409 415/115 |

FOREIGN PATENT DOCUMENTS

| | | |
|---|---|---|
| DE | 4434764 A1 | 6/1995 |
| DE | 4403419 A1 | 8/1995 |
| DE | 202004017309 U1 | 3/2005 |
| DE | 202010003361 U1 | 9/2010 |
| DE | 102009042536 A1 | 4/2011 |
| DE | 102011014476 A1 | 7/2012 |
| EP | 0229001 A1 | 7/1987 |
| EP | 2532884 A1 | 12/2012 |
| FR | 822092 A | 12/1937 |
| KR | 20120063888 A | 6/2012 |
| RU | 2418191 C1 | 5/2011 |
| WO | 2009084992 A1 | 7/2009 |
| WO | 2010131891 A2 | 11/2010 |
| WO | 2011045820 A1 | 4/2011 |
| WO | 2011136649 A1 | 11/2011 |
| WO | 2013108953 A1 | 7/2013 |

* cited by examiner

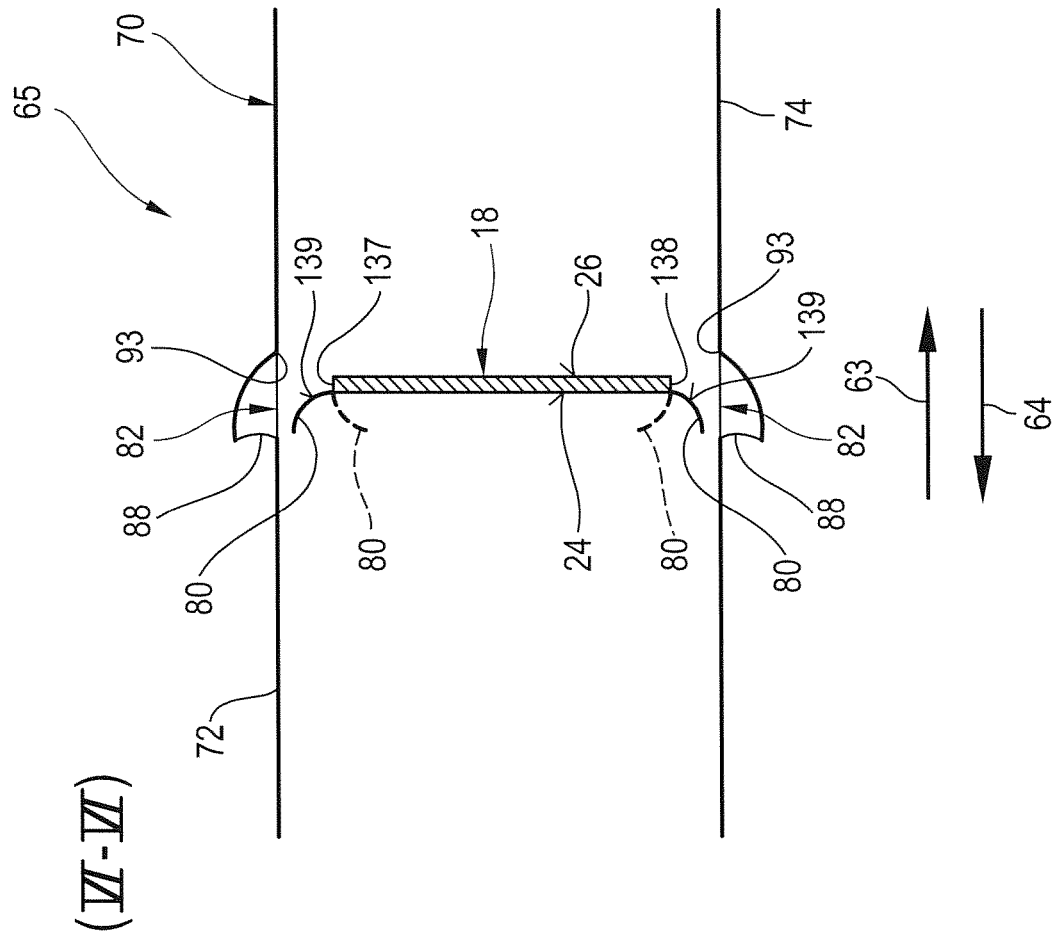

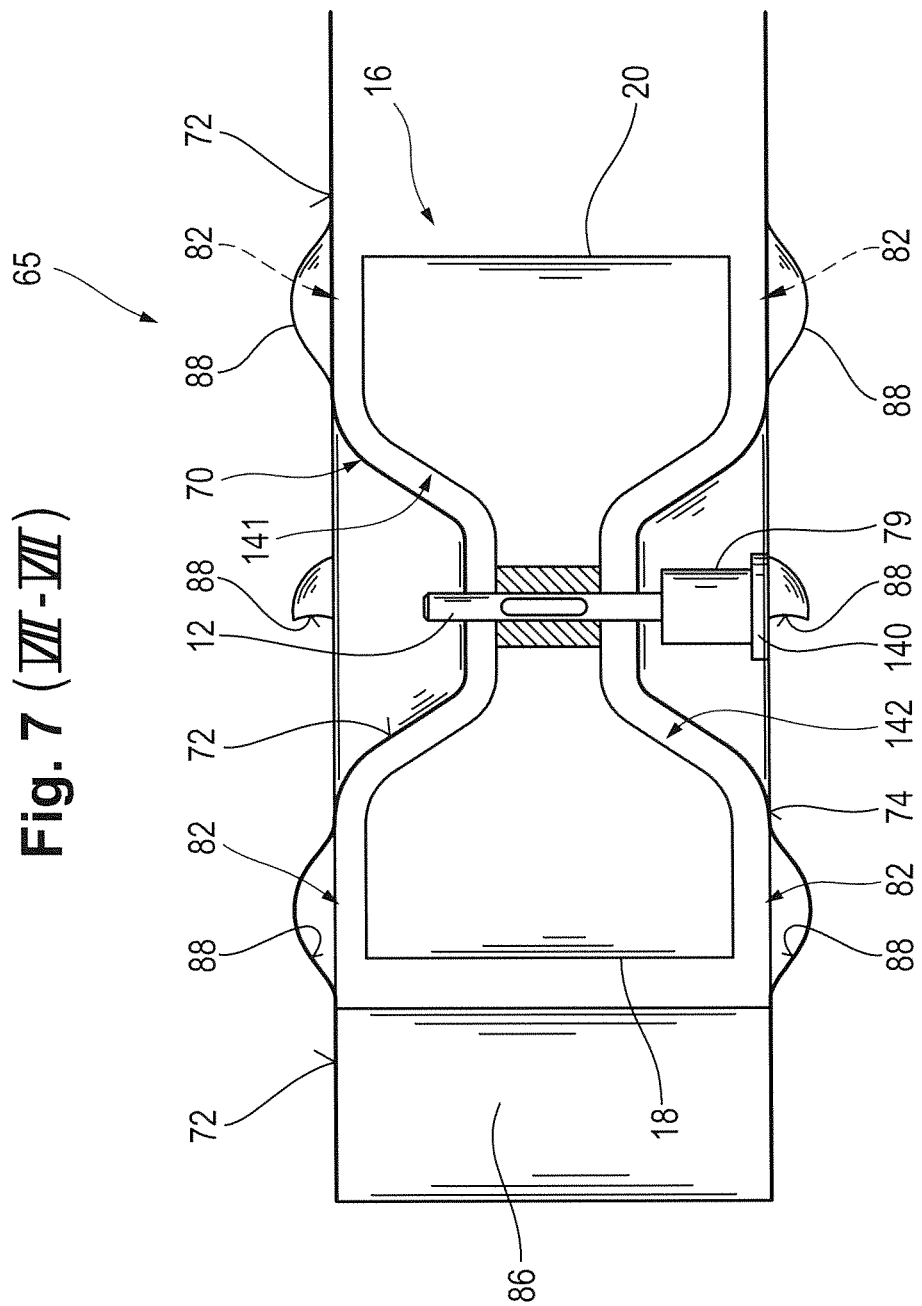

ROTOR AND FLUID TURBINE WITH ROTOR

FIELD OF THE INVENTION

The present invention relates to a rotor comprising a vertical rotation axis and at least two rotor blades arranged on the rotation axis, wherein each rotor blade comprises a curved first portion, wherein the first portion has a concave side and a convex side. Furthermore, it relates to a fluid turbine comprising such a rotor, wherein the rotor is arranged within a housing, and wherein a top and a bottom of the housing are arranged essentially vertical with respect to the rotation axis.

BACKGROUND OF THE INVENTION

Such rotors are used to generate energy from water, air or other fluid flows. In the operation of such a rotor, at least one rotor blade moves in the direction of or together with the fluid flow and at least one rotor blade moves against the direction of the fluid flow or against the fluid flow. For example, a wind turbine rotor is known from DE 20 2004 017 309 U1, having a rotor which is rotatable about a vertical axis, wherein the rotor blades are subdivided into a plurality of half-shell-shaped partial blades. Vertical gaps are arranged between the partial blades to allow air to pass through.

SUMMARY OF THE INVENTION

It is an object of the present invention to provide a rotor that has high efficiency.

The object is achieved by a rotor comprising a vertical rotation axis and at least two rotor blades arranged on the rotation axis, wherein at least one rotor blade comprises a curved first portion, wherein the first portion has a concave side and a convex side, wherein a curved second portion is arranged on the end of the first portion of the rotor blade facing away from the rotation axis, wherein the second portion has a concave side and a convex side, and wherein the two portions are arranged in such a manner that, in the radial direction, the convex side of the first portion is followed by the concave side of the second portion.

An advantage of the present invention is that by arranging the second portion at the first portion of the rotor blade on the convex side of the first portion and the concave side of the second portion of the rotor blade, also referred to as the front side of the rotor blade in the following, in particular on the end of the rotor blade facing away from the rotation axis, a particularly high resistance against the fluid flow impinging thereon is achieved. Since the lever action is at its greatest there, the greatest transmission of force is achieved so that the rotor blade is particularly effectively moved in the direction of the fluid flow. In contrast, due to the concave side of the first portion and the convex side of the second portion, referred to as the back side of the rotor blade in the following, the side of the rotor blade moving against the direction of the fluid flow is more aerodynamic, in particular on the end of the rotor blade facing away from the rotation axis, and has a lower flow resistance. The direction of rotation of the rotor resulting from the front side of the rotor blade moving in the direction of the fluid flow, and the back side of the rotor blade moving against the direction of the fluid flow, respectively, corresponds to the preferred direction of rotation of the rotor.

Preferably, more than one, or all rotor blades, respectively, comprise a first and second portion, as described above. By these means, particularly uniform flow behavior of the rotor is achieved.

The rotor blade or blades are preferably integrally formed, i.e. have a one-piece configuration. This has the advantage that the rotor blades do not have to rely on supporting structures on the top and/or bottom. In preferred embodiments, the rotor blade or blades can have cut-outs in the area of the rotation axis, so that the fluid flow can pass through these cut-outs and accumulation of the fluid flow will not be too strong.

Preferably the rotor has three rotor blades. This enables particularly high efficiency to be achieved with comparatively low material costs. In alternative embodiments two, four, five or more rotor blades can be provided.

Advantageously an angle formed between the convex side of the first portion and the concave side of the second portion is smaller than 120°, such as 110° or 100°, preferably smaller than 90°, e.g. 80°. By these means, a bucket-like shape of the at least one rotor blade is achieved, into which the fluid flow is guided and which provides higher flow resistance to the fluid flow, thus enabling a high proportion of the fluid flow to be used for force transmission. The force transmission is particularly effective since this bucket-like area of the at least one rotor blade is far removed from the rotation axis so that the fluid flow impinging here has a greater lever action. On the side of the rotor blade moving against the fluid flow, a protruding edge that has a particularly aerodynamic shape results due to the angle formed, which is smaller than 120°, for example 110° or 100°, preferably smaller than 90°, for example 80°, thus decreasing the flow resistance on this side. By these means, less force is used to return the rotor blade against the fluid flow. This shape of the rotor blade is particularly efficient because it is arranged in an area remote from the rotation axis, which is where the highest rotation speed occurs. Alternatively the angle formed between the convex side of the first portion and the concave side of the second portion can be variably configured, for example by linking the two portions in an articulated manner.

In preferred embodiments, at least one wing element is moveably arranged on an upper edge and/or a lower edge of at least one rotor blade in the area of the first portion. The wing element is preferably arranged in such a manner that when the fluid flow impinges on the front side of the rotor blade, it flips up and thus increases the surface area of the rotor blade. By these means the fluid flow can be even better received by the rotor blade. When the rotor blade is returned against the fluid flow, the wing element folds towards the front side of the rotor blade due to the fluid flow impinging on the back side of the wing element, so that no additional surface area results and thus the rotor blade does not have a greater flow resistance when moved against the fluid flow. In this way the efficiency of the rotor can be even further improved. It is preferably formed in such a manner that it cannot be pressed beyond the top or bottom edge by the fluid flow into the area of the back side of the rotor blade. The wing element can for example be mounted swivably on a swivel axis and/or be made from an elastic material. Preferably, it can span along one or more than one section or continuously along the entire length of the upper edge and/or lower edge of the first portion of the rotor blade. Preferably more than one or each rotor blade comprises at least one wing element.

In advantageous embodiments the first portion of the rotor blade comprises at least one opening with an openable closure element. The closure element is arranged on one side, preferably the convex side, of the rotor blade in such a manner that the closure element opens the opening due to the fluid flow when the rotor blade is moving against the fluid flow. By these means, the flow resistance of the rotor blade is reduced when it is returned against the fluid flow. The closure element is also arranged in such a manner that it closes the opening due to the fluid flow when the rotor blade is moving in the direction of the fluid flow. In this way the flow resistance of the rotor blade remains just as high when it is receiving the fluid flow as it would be without the at least one opening in the first portion of the rotor blade. This helps to further improve the efficiency of the rotor.

Advantageously at least one vane element is moveably arranged on the convex side of the second portion of the rotor blade. The vane element is arranged in such a manner that its free end protrudes from the convex side of the second portion of the rotor blade when the rotor blade is moving with the fluid flow. By these means, an additional surface area is provided for receiving the fluid flow on the front side of the rotor blade. If the rotor blade is returned against the fluid flow, the vane element is closely adjacent to the convex side of the second portion of the rotor blade and thus reduces the flow resistance of the rotor blade during its return. By these means the efficiency can be additionally increased.

Preferably, at least one rotor blade has at least a first height at a first distance parallel to the rotation axis and a second height at a second distance parallel to the rotation axis, wherein the first distance and the first height are smaller than the second distance and the second height. By these means a flow resistance of the rotor blade in the area remote from the rotation axis is greater than in the area near the rotation axis, also referred to as the inside of the rotor blade in the following, whereby the reception of the fluid flow by the rotor blade in the area remote from the rotation axis, also referred to as the outside of the rotor blade in the following, is improved and efficiency thus further increased. This applies, in particular, to the front side of the rotor blade which, due to the above-described structure, has a higher flow resistance than the back side of the rotor blade. The fact that the fluid flow is primarily received in the area remote from the rotation axis is also particularly effective due to the greater lever action in this area. Particularly preferably each rotor blade has at least a first and a second height as described above.

It is a further object of the present invention to provide a fluid turbine comprising a rotor which has high efficiency.

In a fluid turbine comprising a rotor having one or more of the above-described features, wherein the rotor is arranged in a housing, wherein a top and a bottom of the housing are arranged essentially vertical to the rotation axis, the object is achieved by the rotor being rotatable relative to the housing, wherein the housing has at least a first distance between the top and bottom of the housing at a first distance parallel to the rotation axis and a second distance between the top and bottom of the housing at a second distance parallel to the rotation axis, wherein the first distance parallel to the rotation axis and the first distance between the top and bottom of the housing is smaller than the second distance parallel to the rotation axis and the second distance between the top and bottom of the housing.

The top and/or bottom of the housing can have any shape, e.g. square, round, or polygonal. As a result of the distance between the top and bottom of the housing being smaller in the area of the rotation axis than further removed from the rotation axis, the Venturi effect is created, by which the fluid flow passes by the area near the rotation axis faster toward the outside of the rotor blade. The Venturi effect causes the fluid flow to thus exert a greater pressure force on the outside of the rotor blade which due to the different shape of the front and back sides of the rotor blade relating to the fluid flow has a greater effect on its front side than on the more aerodynamic back side of the rotor blade. By these means, the efficiency of the fluid turbine is further increased.

Preferably the distance between the top of the housing and the rotor blades and between the bottom of the housing and the rotor blades is essentially constant. This is the best way of utilizing the fluid flow since there are no areas between the rotor blade and the top and bottom of the housing where the fluid flow passes quicker, for example, than others. The fluid flow is thus directed particularly uniformly onto the outside of the rotor blade.

Advantageously, at least one flap element is arranged radially outwardly from the rotation axis along the top and the bottom of the housing, which has a height parallel to the rotation axis which corresponds to the distance between the top and the bottom of the housing and the rotor blades. Preferably, the flap element is pivotable about an articulation point by a maximum of 90°, for example between 0° and 90°, or between 0° and 70°, from a position parallel to the rotation axis into a folded-down position. The flap element is preferably arranged in such a manner that it is in a position parallel to the rotation axis when the rotor blade positioned directly between the flap elements on the top and bottom is moving with the fluid flow. The flow resistance of the rotor blade is thus increased. If the rotor blade moves between the flap elements against the fluid flow, it is in the folded-down position. In this way, the flow resistance of the rotor blade is reduced. As an alternative to a pivotable flap element, a flap element made from an elastic material can be arranged along the top and the bottom of the housing. In further alternative embodiments at least one pivotable flap element and at least one flap element made from an elastic material can be arranged along the top and the bottom of the housing as described above.

In preferred embodiments, at least one fluid slot is arranged in the top and/or the bottom of the housing. It is arranged in such a manner that a fluid flow can pass through the fluid slot to the front side of the rotor blade or that the fluid flow creates a suction as it passes the fluid slot due to the Bernoulli effect, by which the fluid, e.g. air or water, is sucked out of the housing from the area of the back side of the rotor blade. This can increase the pressure on the front side of the rotor blade, or reduce the flow resistance when the rotor blade is returned. This leads to an increase in the efficiency of the fluid turbine. Preferably, at least two fluid slots are arranged in the top and/or on the bottom of the housing. The first fluid slot is preferably arranged in such a manner that the fluid flow passes through the first fluid slot into the housing and onto the front surface of the rotor blade and exerts a higher pressure onto the latter. The second fluid slot is preferably arranged in such a manner that the fluid flow creates a suction as it passes the fluid slot due to the Bernoulli effect, by which the fluid, e.g. air or water, is sucked out of the housing from the area of the back side of the rotor blade, thus reducing the flow resistance when the rotor blade is returned. In this way the efficiency of the fluid turbine can be further improved. In particularly preferred embodiments at least two fluid slots as described above are arranged in the top and the bottom of the housing, whereby the efficiency of the fluid turbine can be even further improved.

In advantageous embodiments the housing comprises at least two support elements arranged between the top and bottom of the housing. They mainly serve to support the top and bottom so that the rotor blades are free to rotate between the top and bottom of the housing. Furthermore, the support elements can also be shaped in such a manner that they guide the fluid flow so that it impinges, for example, at the best possible angle and/or with a changed speed, on the rotor blades. The support elements do not get closer than the outer diameter of the rotor disk of the rotor blades and do not contact the latter.

In further embodiments, a sidewall can also be provided for the housing, which partially extends between the top and bottom of the housing. It preferably comprises a fluid inlet opening and a fluid outlet opening and can serve to shield the rotor blades against unfavorable fluid flows.

In a further embodiment, the fluid turbine can comprise a support element for mounting of the housing. It can be a mast, for example, or a low support element of a similar size as the housing to fix the housing close to the ground or to another surface, e.g. a roof.

In preferred embodiments, a generator is integrated in the housing. The generator can be arranged, for example, in the area of the rotation axis.

Advantageously the first housing is arranged in a cuboid outer housing, wherein the outer housing is mountable on a vertical support mast and rotatable relative to the support mast, wherein the rotation axis of the rotor is parallel to the support mast, wherein the outer housing, on a cuboid side extending in parallel to the rotation axis, comprises a first opening as a fluid inlet and, on a second cuboid side opposite the first cuboid side, comprises a second opening as a fluid outlet. The housing can align itself in the fluid without the aid of motors like a weathervane according to the direction of the fluid flow so that the fluid passes into the fluid inlet. The fluid flow passes through the outer housing in a more defined area onto the rotor blades so that it can be more effectively used. This has a positive effect on the efficiency of the fluid turbine.

Preferably, the outer housing comprises a flag element on at least one edge of the second cuboid side extending in parallel to the rotation axis of the rotor. This facilitates optimum alignment of the outer housing in the fluid flow without motive force.

In preferred embodiments, a baffle element is arranged in the fluid inlet. The baffle element is preferably arranged in such a manner that it deflects the fluid flow from the rotor blade moving against the fluid flow. By these means, a greater proportion of the fluid flow passes onto the front side of the rotor blade moving in the direction of the fluid flow. Moreover, the flow resistance of the rotor blade moving against the fluid flow is smaller since for the most part it is not exposed to the fluid flow. The result is thus a further improvement in efficiency.

In preferred embodiments the first housing comprises a surface element connected to the top and bottom of the housing and parallel to the rotation axis, which is curved in correspondence to the rotor disk of the rotor blades and is arranged in the outer housing at a position diagonal to the baffle element. In this way, an area in which the rotor blade can receive the fluid flow is increased. Furthermore, the Venturi effect, arising from the reduction of the distance between the top and bottom of the first housing, can be increased. By these means efficiency can be further improved.

Advantageously the outer housing comprises at least one fluid opening on at least one side wall extending in parallel to the rotation axis of the rotor. A fluid flow passing the outside of the outer housing flowing past this fluid opening creates the Bernoulli effect so that fluid which is in the interior of the outer housing is sucked out through the fluid opening. This decreases the flow resistance for the rotor blade moving against the direction of the fluid flow, thus improving efficiency. Preferably at least one fluid opening is arranged on opposing side walls extending in parallel to the rotation axis of the rotor.

Preferably a fluid guard element and/or a fluid intake element covering the fluid opening are arranged on one of the side walls, which has an obtuse angle in the direction of the first cuboid side and the second cuboid side, respectively. If a fluid guard element is arranged on the side wall along which the rotor blade moves against the direction of the fluid flow, the Bernoulli effect is amplified, while a fluid intake element can cause additional intake of fluid flow on the rotor blade. The fluid intake element is arranged on the side wall along which the rotor blade moves in the direction of the fluid flow. The arrangement of at least one fluid guard element and/or at least one fluid intake element can lead to an additional increase in the efficiency of the fluid turbine.

BRIEF DESCRIPTION OF THE DRAWING

The present invention will be described in more detail with reference to a preferred exemplary embodiment, wherein:

FIG. 6 shows a sectional view along line VI-VI of FIG. 5 of a wind turbine according to the fourth example;

FIG. 7 shows a sectional view along line VII-VII of FIG. 5 of a wind turbine according to the fourth example;

DETAILED DESCRIPTION OF THE INVENTION

The invention will be described in an exemplary manner with reference to examples embodied as a wind turbine or a rotor for a wind turbine. The following explanations therefore also apply to rotors and turbines for any other fluids, in particular water.

Figure 1:
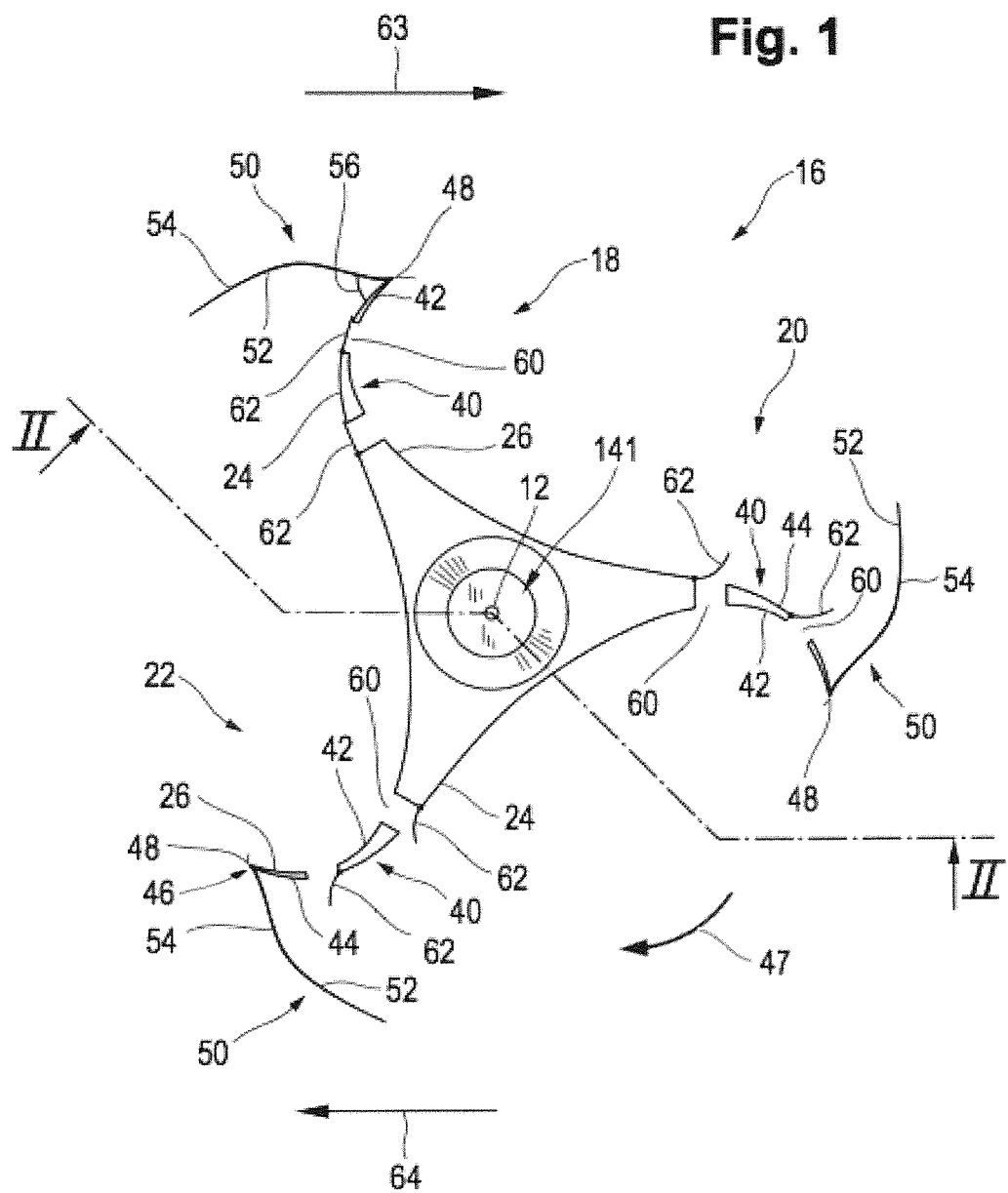
FIG. 1 shows a plan view of a rotor according to one example of the present invention.

FIG. 1 shows a plan view of a rotor 16 according to an example of the present invention. In the present example, the rotor 16 comprises a vertical rotation axis 12, normal to the drawing plane in the present illustration, and three rotor blades 18, 20, 22, arranged on the rotation axis 12. Alternatively, two, four, five or more rotor blades could also be arranged on the rotation axis 12 instead of the three rotor blades 18, 20, 22. In the presently shown example, each rotor blade 18, 20, 22 comprises a curved first portion 40, having a concave side 42 and a convex side 44. On the end 46 of the first portion 40 facing away from the rotation axis 12, a curved second portion 50 is arranged having a concave side 52 and a convex side 54. The first and second portions 40, 50 are arranged in such a manner that, in the radial direction, the convex side 44 of the first portion 40 is followed by the concave side 52 of the second portion 50. The second portion 50 is preferably directly integrally formed, i.e. without an air gap or the like, on the first portion 40. An angle 56 is formed between the convex side 44 of the first portion and the concave side of the second portion 50, which is smaller than 90° in the example shown. In alternative embodiments, the angle 56 formed can also be between 90° and 120°, for example 95°, 100°, 105°, 110° or 115°, or any angle between them. In further alternative embodiments, the angle 56 formed can also be variable, for example by linking the first and second portions 40, 50 in an articulated manner, in particular in such a way that the angle 56 is reduced at times to angles substantially smaller than 90°, to as little as 0°. By these means, the resistance against the fluid flow can be further minimized as the rotor blade 18, 20, 22 is moved in the preferred direction of rotation 47 of the rotor 16 against the direction of flow. By arranging the second portion 50 on the first portion 40, a kind of bucket is formed for the fluid flow on the front side 24 of the rotor blade 18, 20, 22. Here and in the following examples, a wind flow is presupposed as the fluid flow. However, the rotor blades could also be driven by the flow of any type of fluid, preferably with air or water. Since the bucket is formed in the area remote from the rotation axis, the wind flow impinging there can be particularly efficiently utilized for a rotation in the preferred direction of rotation 47 of the rotor 16, since it has a greater lever action. As a protruding edge 48 a tip is formed on the back side 26 of the rotor blade 18, 20, 22 on the end 46 of the first portion 40, which has an advantageous coefficient of flow resistance. In the embodiment having a moveable linkage of the portions 40, 50 and the variable angle 56, the pivot point between the two portions 40, 50 can be arranged on the end 46. For applications in fluids having a higher density, such as water, in particular, the protruding edge 48 can be formed as a bead instead of a point. The protruding edge 48 formed as the point or the bead, respectively, points into the preferred direction of rotation 47 of the rotor 16.

In alternative embodiments, not every rotor blade 18, 20, 22 need have a first and second portion 40, 50, as described above, but only one or two of three rotor blades, or any number of rotor blades in a rotor having more than three rotor blades, can have such first and second portions 40, 50.

In the presently shown example, two openings 60 having an openable closure element 62 are arranged in the first portion 40 of each of the rotor blades 18, 20, 22. The closure element 62 is arranged in each case in such a manner that it closes the opening 60 when the rotor blade 18, 20, 22 is moving in a first direction 63, which corresponds to the direction of the wind flow, and that it opens the opening 60 when the rotor blade 18, 20, 22 is moving in a second direction 64 which corresponds to the direction against the wind flow. The rotation of the rotor 16, in the present example, is in the clockwise direction and corresponds to the preferred direction of rotation 47 of the rotor 16. In the example shown in FIG. 1, two openings 60 with closure elements 62 are arranged in the portion 40 of each of rotor blades 18, 20, 22. Alternatively, one, three, four or more openings 60, each having a closure element 62, could also be provided in the first portion 40 of the rotor blade 18, 20, 22. The closure element 62, in the exemplary embodiment shown here, is formed as a flap and of a flexible material, which can bend. However, the flap can also be of a rigid material. In the example shown in FIG. 1, the flap is pivotably supported at one end on the side of the opening 60 closer to the rotation axis 12, wherein the other end of the flap extends radially outwards. When the flap closes off the opening 60, the radially inwardly extending end of the flap, for example, is arranged on the first portion 40 of the rotor blade 18, 20, 22 adjacent to the opening 60. The flap shown in the present exemplary embodiment is preferably arranged on the front side 24 of the rotor blade 18, 20, 22, so that it is pressed against the first portion 40 of the rotor blade 18, 20, 22 and thus closes off the opening 60, when the rotor blade 18, 20, 22 is moving in the preferred direction of rotation 47 in the direction of the wind flow. If the rotor blade 18, 20, 22 is moved in the preferred direction of rotation 47 in the second direction 64 against the wind flow, the flap automatically opens the opening, since the wind flow penetrating the openings 62 from the back side 26 of the rotor blade 18, 20, 22, presses against the flap so that it swings open. In this way the flow resistance of the back side 26 of the rotor blade 18, 20, 22 is reduced.

The rotor 16 comprises hub recesses 141, 142 in the area of the rotation axis 12, wherein only the top hub recess 141 can be shown in the plan view of FIG. 1. The hub recesses 141, 142 will be explained in more detail with reference to the following figures. Alternatively or additionally, the rotor 16 can have cut-outs in the area of the rotation axis 12 for the wind flow to pass through these cut-outs in order to avoid accumulation of the wind flow becoming too strong.

Figure 2:
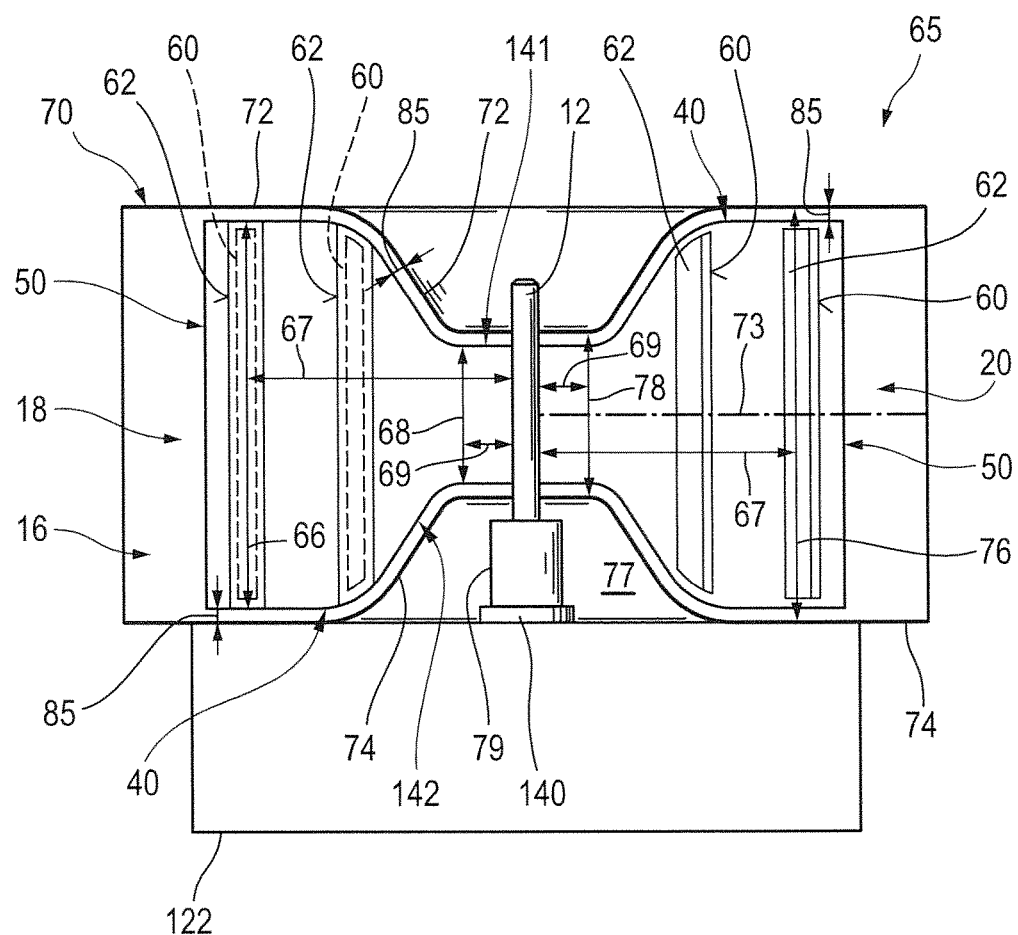
FIG. 2 shows a sectional view of a wind turbine along line II-II of FIG. 1 according to a first example of the present invention.

FIG. 2 shows a side view of a wind turbine 65 as an example of a fluid turbine according to a first example of the present invention. The wind turbine 65 comprises a housing, in which the rotor 16 is rotatably arranged relative to the housing 70. The illustration shown in FIG. 2 comprises two rotor blades 18, 20, each having a first height 68 at a first distance 69 parallel to the rotation axis 12 and a second height 66 at a second distance 67 parallel to the rotation axis 12. The first distance 69 and the first height 68 are smaller than the second distance 67 and the second height 66 so that the rotor blades 18, 20 taper towards the rotation axis 12. This creates a top and bottom hub recess 141, 142 of the rotor 16. In alternative embodiments, instead of a continuous taper, for example, a step could also be provided. The tapering of the rotor blades 18, 20 towards the rotation axis 12 is preferably non-linear, but the height 66 is constant in a predefined area and descends to the first height 68 in the shape of a curve. Preferably, the taper, as shown here, is symmetrical to a longitudinal axis 73 of the rotor blade 18, 20, vertical to the rotation axis 12. The taper of the rotor blades 18, 20 shown here preferably applies to the first portion 40 of the rotor blades 18, 20. The second portion 50, at the transition to the first portion 40, preferably has the same height as the first portion 40 in this area. In the direction towards the end of the second portion 50 facing away from the first portion 40 the height of the second portion 50 can decrease or remain constant.

In the present exemplary embodiment, the closure elements 62 are in the area of the first portion 40 having the second height 66, as well as in the area in which the first portion 40 begins to taper to the first height 68. The closure elements 62 on the rotor blade 18, shown here on the left, are shown in a closed state, which corresponds to a position which the closure elements 62 assume when the direction of the wind flow is the first direction 63 (FIG. 1) and the rotor blade 18 also moves in the first direction 63, which corresponds to a rotation of the rotor 16 in the preferred direction of rotation 47 (FIG. 1). This is why the openings 60 which are covered by the closure elements 62 are shown with broken lines. The closure elements 62 on the rotor blade 20, shown here on the right, are open since the rotor blade 20 moves in the second direction 64 (FIG. 1) against the wind flow. Through the opening 60, a portion of the opened closure element 62 is visible which, as shown in FIG. 1, is bent into the drawing plane.

The housing 70 comprises a top 72 and a bottom 74 arranged essentially vertical to the rotation axis 12. The housing 70 comprises a first distance 78 between the top and bottom 72, 74 of the housing 70 at the first distance 69 parallel to the rotation axis 12 and a second distance 76 between top and bottom 72, 74 of the housing 70 at the second distance 76 parallel to the rotation axis 12. Herein, the first distance 69 parallel to the rotation axis 12 and the first distance 78 between top and bottom 72, 74 of the housing 70 are smaller than the second distance 67 parallel to the rotation axis 12 and the second distance 76 between top and bottom 72, 74 of the housing 70. The distance 85 between the top 72 of the housing 70 and the rotor blades 18, 20, 22 and between the bottom 74 of the housing 70 and the rotor blades 18, 20, 22 is preferably essentially constant. The housing 70 thus conforms to the hub recesses 141, 142 of the rotor 16. The tapering of the housing 70 causes the Venturi effect, by which the wind flow is directed onto the outer sides of the rotor blades 18, 20, thus increasing the efficiency of the wind turbine, since the outer sides of the rotor blades 18, 20 have a greater lever action.

The bottom 74 of the housing 70 is mounted on a support element 122 which carries the wind turbine 65, when installed on the ground or on a roof. The support element 122 is preferably formed as a solid cuboid having a surface that is slightly smaller than the bottom 74 of the housing 70 as shown in FIG. 2, but which can alternatively also be the same size or larger than the bottom 74 of the housing 70. The support element 122 can alternatively also be a mast on which the housing 70 is mounted. In the example shown in FIG. 2, a generator 79 is arranged in a cavity 77 between the bottom 74 of the housing 70 and the support element 122, which is arranged in a non-rotation manner on the support element 122 by a generator flange 140 and transforms the rotation of the rotor 16 to electrical energy. Alternatively, the generator 79 can also be arranged above the housing 70 on its top 72 above the top hub recess 141. In this position the generator 79 is essentially protected against wind. The area above the top hub recess 141 and/or the area below the bottom hub recess 142 in which, in the present example, the generator 79 is arranged, can also be covered, such as by means of a plate, thus enabling the generator 79 to be protected against further weather phenomena, such as rain, or to be protected against the water surrounding the housing 70 when it is arranged in water.

The wind turbine shown in FIG. 2 is in addition to air also suitable for operation with any other fluid flow, such as water.

Figure 3:
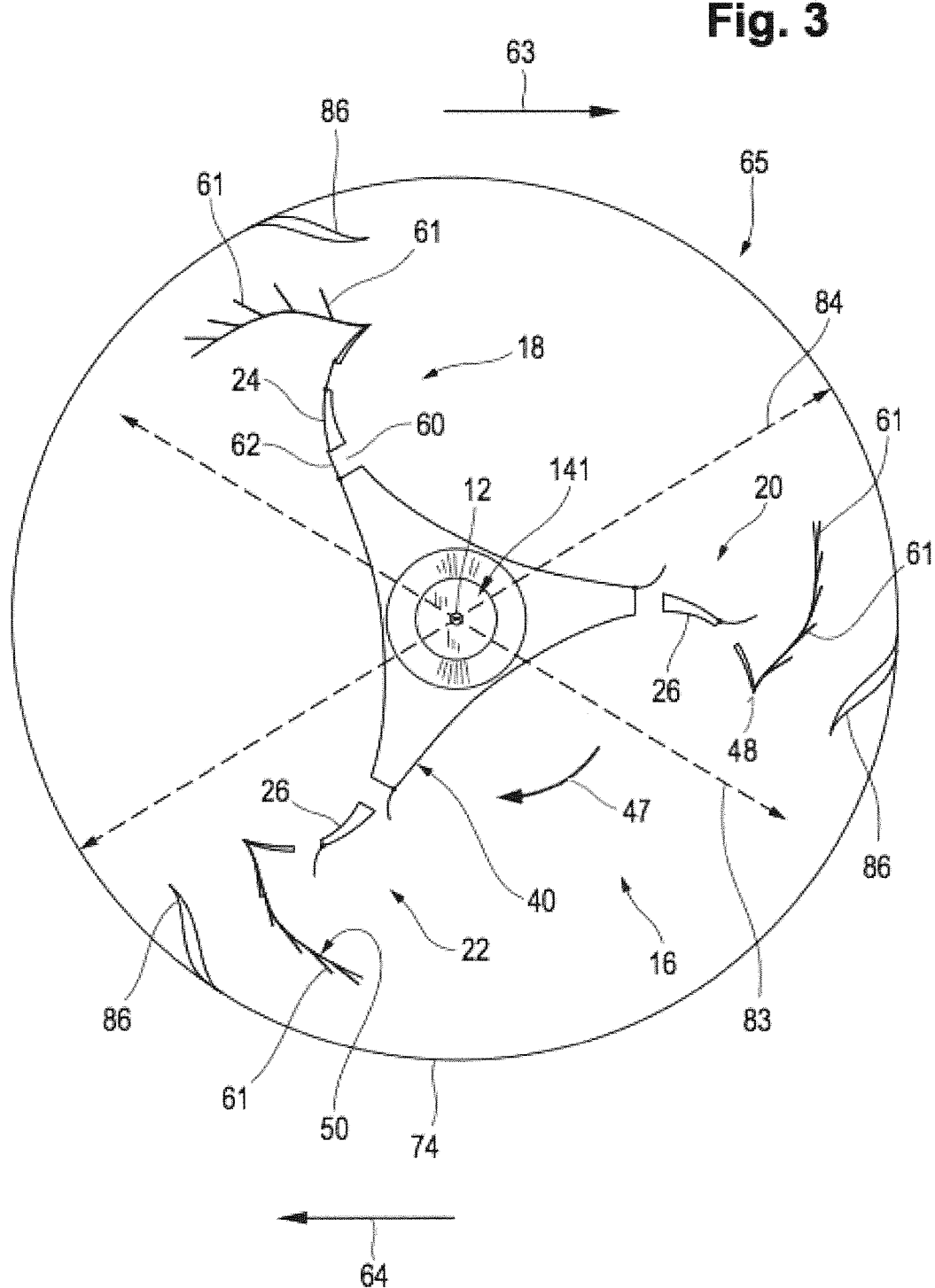
FIG. 3 shows a plan view of a wind turbine according to a second example.
Figure 4:
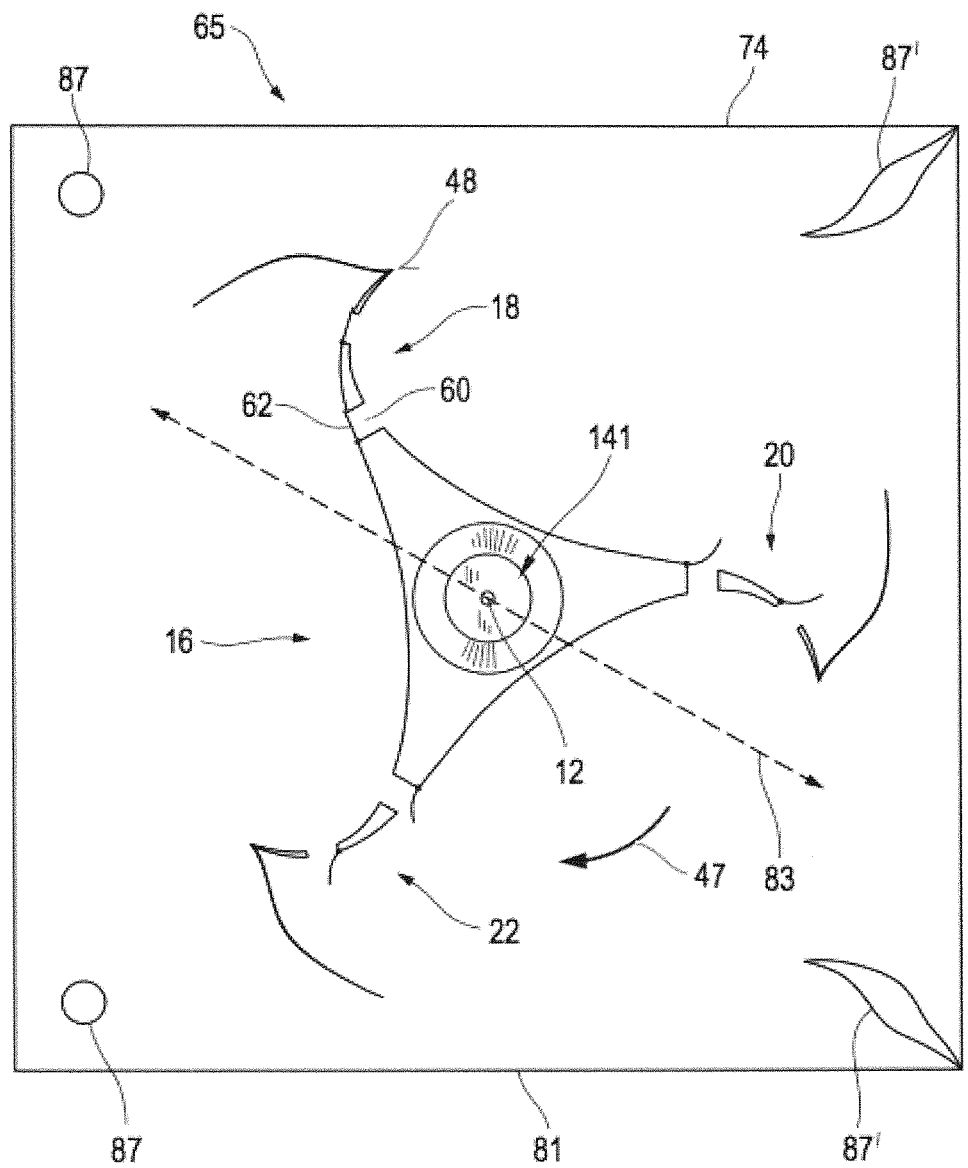
FIG. 4 shows a plan view of a wind turbine according to a third example.

FIGS. 3 and 4 show plan views of wind turbines 65 having a housing 70 according to second and third exemplary embodiments of the present invention, respectively.

In FIG. 3, the housing 70 comprises top and bottom 72, 74 having a circular circumference. For reasons of clarity, the top 72 is omitted in FIG. 3 so that the underlying rotor 16 is visible. The diameter 84 of the top and bottom 72, 74 is preferably larger than the diameter 83 of the rotor disk of the rotor blades 18. Support elements 86 for the top and bottom 72, 74, which are formed contiguous from the top 72 to the bottom 74, are preferably arranged between the top and bottom 72, 74 of the housing 70 as shown in FIG. 3, in an area outside of the rotor disk of the rotor blades 18, 20, 22. They mainly serve to support the top and bottom 72, 74 so that the rotor blades 18, 20, 22 are free to rotate between the top and bottom 72, 74 of the housing 70. The support elements 86 have a curved configuration in the present exemplary embodiment so that they guide the fluid flow so that it impinges, for example, at a favorable angle and/or at a changed speed on the rotor blades 18, 20, 22 and/or so that the fluid flow impinging on the rotor blades 18, 20, 22 is not negatively affected, such as by unfavorable swirling. More or less than three support elements 86 as shown, for example four, five, six or seven, or just two support elements 86 can be arranged between the top and bottom 72, 74 in equal or any distance to each other. The support elements 86 are not closer than the rotor disk of the rotor blades 18, 20, 22 and do not contact the latter. The rotor 16 essentially corresponds to the rotor shown in FIG. 1, each rotor blade 18, 20, 22 having a first portion 40 comprising two openings 60 provided with an openable closure element 62, and a second portion 50 connected to the first portion 40. A protruding edge 48 is formed at the end 46 (FIG. 1) of the first portion 40 facing away from the rotation axis 12 at the transition to the second portion 50 and points into the preferred direction of rotation 47 of the rotor 16. In FIG. 3, five vane elements 61 are moveably arranged in addition on the convex side 54 of the second portion of the rotor blade 18, 20, 22. The number of vane elements is any particular number, so that one, two, three, four, six or more vane elements could also be provided in alternative embodiments. The vane elements 61 flip up from the convex side 54 of the rotor blade 18, 20, 22 when the latter is moving in the direction of the wind flow, in this case in the first direction 63, due to the wind catching under the vane element 61. In this way the surface of the rotor blade 18, 20, 22, which is caught by the wind flow in the first direction 63 when the rotor 16 rotates in the preferred direction of rotation 47, is enlarged, which means that the wind flow can be better received. This is particularly effective in the area remote from the rotation axis because of the greater lever action in this area. On the other hand, the vane elements 61 are closely adjacent to the convex side 54 of the second portion of the rotor blade 18, 20, 22 when it is moving in the second direction 64 against the wind flow when the rotor 16 rotates in the preferred direction of rotation 47. The flow resistance of the back side 26 of the rotor blade 18, 20, 22 is thus not substantially increased by the vane elements 61.

The wind turbine 65 shown in FIG. 3 can also be operated with other fluids instead of air, preferably for example with water.

In FIG. 4, the top and bottom 72, 74 of the housing 70 have a square configuration at the outer edges 81, wherein the top 72 is not shown for clarity. The rotor 16 corresponds to the rotor shown in FIG. 1, each rotor blade 18, 20, 22 having two openings 60, which are closable by means of an openable closure element 62. A protruding edge 48 is formed at the end 46 (FIG. 1) of the first portion 40 (FIG. 1) facing away from the rotation axis 12 at the transition to the second portion 50 (FIG. 1) and points into the preferred direction of rotation 47 of the rotor 16. The top and bottom 72, 74 of the housing 70 protrude beyond the diameter 83 of the rotor disk of the rotor blades 18, 20, 22 on all sides. Support elements 87, 87' are arranged between the top and bottom 72, 74 at the four corners of the top and bottom. The support elements 87, 87' extending from the top 72 to the bottom 74 can be formed as rods, for example having a round cross-section, such as the support elements 87 shown on the left, or having a curved cross-section, such as the support elements 87' shown on the right as an alternative embodiment. However, other shapes, such as square or wedge-shaped cross-sections are also possible, and can in this way influence the direction of the wind flow. The number of the support elements 87, 87' can differ from and can particularly be larger than the number of the support elements 87, 87' shown in FIG. 4. For example, two, five, six, seven or more support elements 87, 87' can be provided. Otherwise the support elements 87, 87' serve to support the top and bottom 72, 74 of the housing 70 so that the rotor blades 18, 20, 22 are free to rotate between the top and bottom 72, 74.

In further alternative embodiments, not shown here, the top and bottom of the housing can also be triangular or have more than four corners, and the top can also have a different shape from the bottom. The wind turbine 65 shown in FIG. 4 can alternatively be operated with a different fluid, such as with water.

Figure 5:
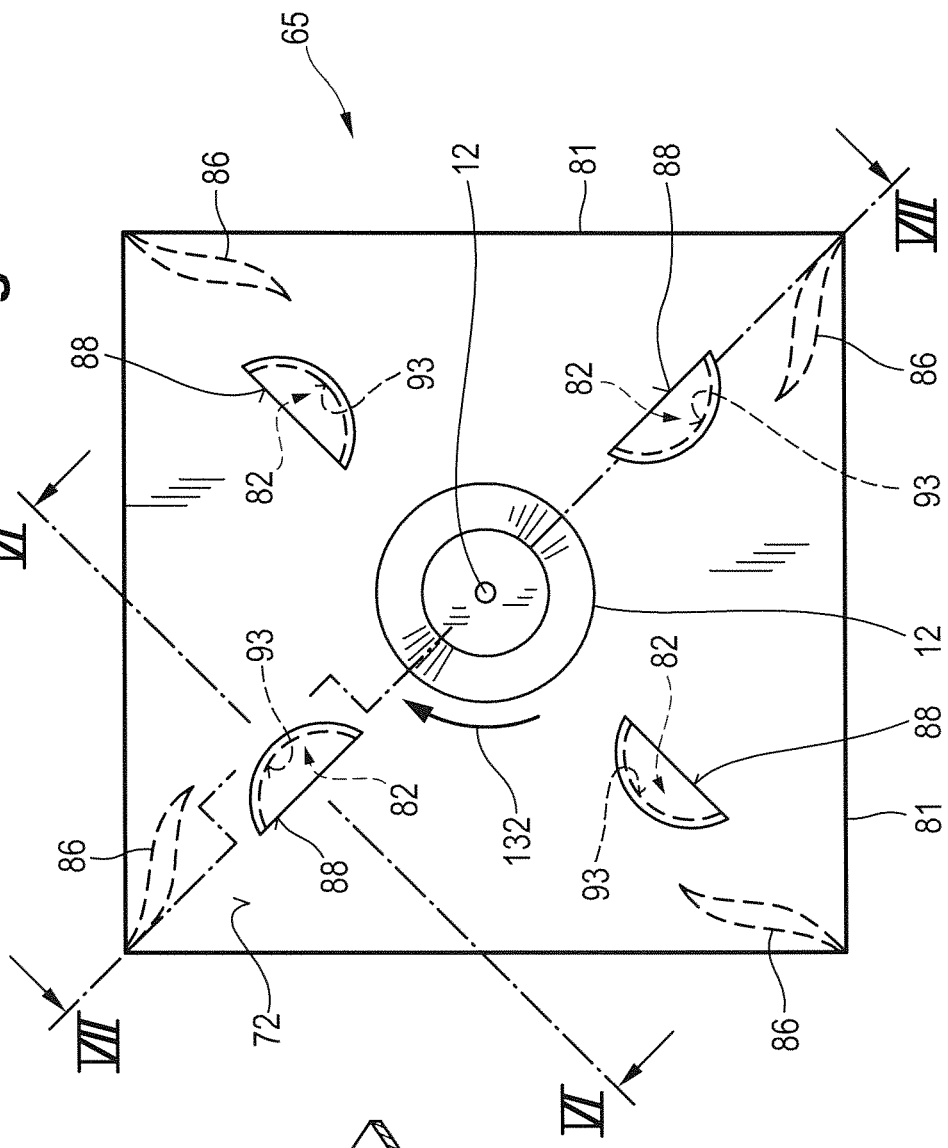
FIG. 5 shows a plan view of a wind turbine according to a fourth example.
Figure 5A:
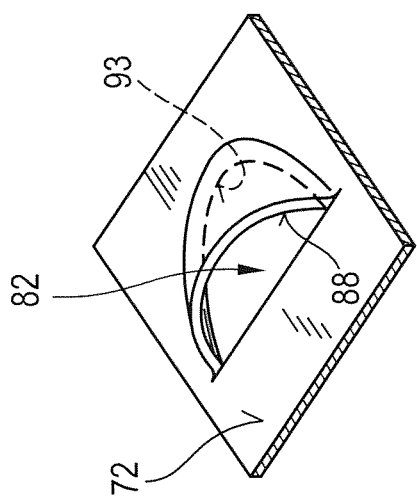
FIG. 5A shows a detailed view of a fluid slot of FIG. 5.

FIG. 5 shows a plan view of a wind turbine 65 according to a fourth example. The top and bottom 72, 74 are square at the outer edges 81 in the present example, wherein here neither the bottom 74 nor the rotor blades are shown so that the top 72 is visible. In the present exemplary embodiment four fluid slots 82 are arranged in the top 72. Instead of the four fluid slots 82 in the top 72, it is also possible in further preferred exemplary embodiments, to arrange only one, two, three, but also five, six or more fluid slots 82 in the top 72. One or more fluid slots 82 can also be arranged on the bottom 74 of the housing 70, as also shown in FIGS. 6 and 7. The opening of the fluid slots 82 is created by a cover element 88, which is created, for example, by a bulge of the top 72 above the fluid slot 82. The or each opening can also be created by removing a part of the top 72, thus creating a fluid slot 82, and integrally forming a corresponding, separate cover element, thus defining the direction of the opening. The direction of the opening of the fluid slot 82 preferably depends on the direction of rotation 132 of the rotor, of which only the rotation axis 12 is visible in the present illustration. The opening of the fluid slots 82 corresponds to the direction of rotation 132 of the rotor, i.e. the rotor blades 18, 20, 22 pass below each fluid slot 82 of the top 72, or above each fluid slot 82 of the bottom 74 (FIG. 6), passing the area of the opening first and then a trailing edge 93 of the fluid slot 82. The direction of rotation 132 corresponds to the preferred direction of rotation of the rotor. FIG. 5A shows a detail view of the fluid slot 82 in the top 72 of the housing 70. The fluid slots 82 will be described in more detail with reference to FIGS. 6 and 7.

FIG. 6 shows a sectional view along line VI-VI of FIG. 5 of the wind turbine 65 according to the fourth example. Here, a support element 86 (FIG. 5) which is behind the rotor blade 18 in the perspective, is not shown for clarity. A wing element 80 is moveably arranged on each of an upper edge 137 and a lower edge 138 of the rotor blade 18 shown here. On the other hand, the wing elements 80 can be flipped up by the wind flow in the direction of the top or bottom 72, 74 of the housing 70 when the wind flow impinges on the front side 24 of the rotor blade 18 and moves the latter in the preferred direction of rotation of the rotor in the first direction 63. By these means, the surface area of the rotor blade 18 on which the wind flow impinges is enlarged, so that the latter can be better received by the rotor blade 18. The wing elements 80 can be of a rigid or flexible material and, as an alternative to the simply curved shape shown in FIG. 6, it can be partially straight, straight or curved in several places. Overall, they are shaped and moveably arranged in such a manner that, in the flipped-up position, an air gap remains, for example in the order of a few millimeters, so that the wind flow can circulate and there is no disadvantageous air stall. This means that the height of the flipped-up wing elements 80 corresponds to less than the distance 85 (FIG. 2) between the top 72 or the bottom 74 of the housing 70 and the rotor blade 18 shown here. The wing element 80 can preferably not be folded beyond the upper or lower edge 137, 138 of the rotor blade 18 towards the back side 26 of the rotor blade 18.

On the other hand, the wing elements 80 can be folded down when the wind flow impinges on the back side 26 of the rotor blade 18 and thus the back side 139 of the wing element 80, when the rotor blade 18 is moving in the preferred direction of rotation of the rotor in the second direction 64 against the wind flow. This folded-down position is shown in FIG. 6 in an exemplary manner with a broken line. In the folded-down position of the wing elements 80, the wind flow can escape better between wing elements 80 and the rotor blade 20 than in the flipped-up position of the wing element 80, thus reducing the pressure exerted on the back side 26 of the rotor blade 20.

The wing elements 80 can span along one or more than one section or continuously along the entire length of the upper edge 137 and/or lower edge 138 of the first portion 40 (FIG. 1) of the rotor blade 18. They can for example be mounted swivably on a swivel axis and/or be made from an elastic material.

FIG. 6 also shows fluid slots 82 arranged in the top 72 and bottom 74 of the housing 70. The fluid slots 82 have their opening aligned by the cover element 88 in such a manner that a wind flow moves across the fluid slots 82 in the second direction 64. Due to the Bernoulli effect, a suction is created by the wind flow sucking air out of the housing 70 through the fluid slots 82. When the rotor blade 18 is moving in the preferred direction of rotation of the rotor in the second direction 64 against the wind flow, returning of the rotor blade 18 in the preferred direction of rotation of the rotor against the wind flow is facilitated since the pressure on the back side 26 of the rotor blade 18 is reduced in this area. A wind flow in the first direction 63 can pass through the opening into the housing 70 and onto the front side 24 of the rotor blade 18. By the additional intake of wind flow onto the front side 24 of the rotor blade 18 the rotor is driven more effectively.

As an alternative, a plurality of fluid slots 82 can also be arranged in the top and bottom 72, 74 of the housing 70, as also shown in the examples of FIGS. 5 and 7.

FIG. 7 shows a sectional view along line VII-VII of FIG. 5 of the wind turbine 65 according to the fourth example. Fluid slots 82 with cover elements 88 are shown, each of which are arranged on the top 72 and the bottom 74 of the housing 70 in the area in which the outer sides of the rotor blades 18, 20 move. Since this area of the outer sides of the rotor blades 18, 20, remote from the rotation axis, exhibits great lever action, an additional intake of wind flow onto the front side and withdrawal of wind flow from the back side of the rotor blades 18, 20 is particularly effective here. For fluid slots 82, shown on the left side of the housing 70 in the present illustration, the opening faces out of the drawing plane. On the right side of the present illustration of the housing 70, the openings of the fluid slots 82 arranged there face into the drawing plane. In alternative embodiments, the fluid slots 82 can also be formed above the top or below the bottom hub recesses 141, 142 up to the area of the rotation axis 12 of the rotor 16, or a plurality of fluid slots 82 can be arranged side-by-side.

The wind turbine 65 according to the fourth example of the present invention can alternatively also be operated by any other fluid other than air, preferably water, for example.

Figure 8:
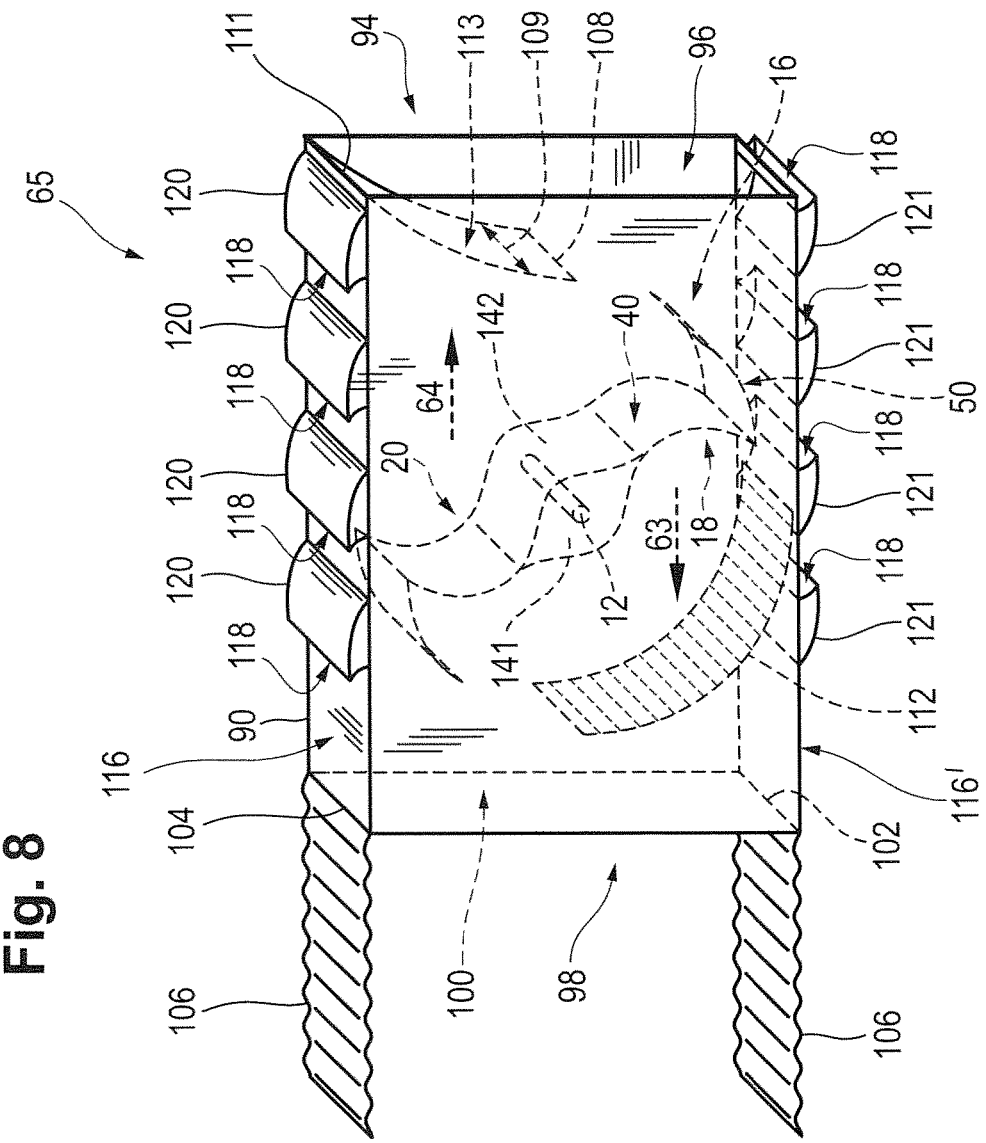
FIG. 8 shows a three-dimensional, first view of the wind turbine having an outer housing according to a fifth example of the present invention.
Figure 9:
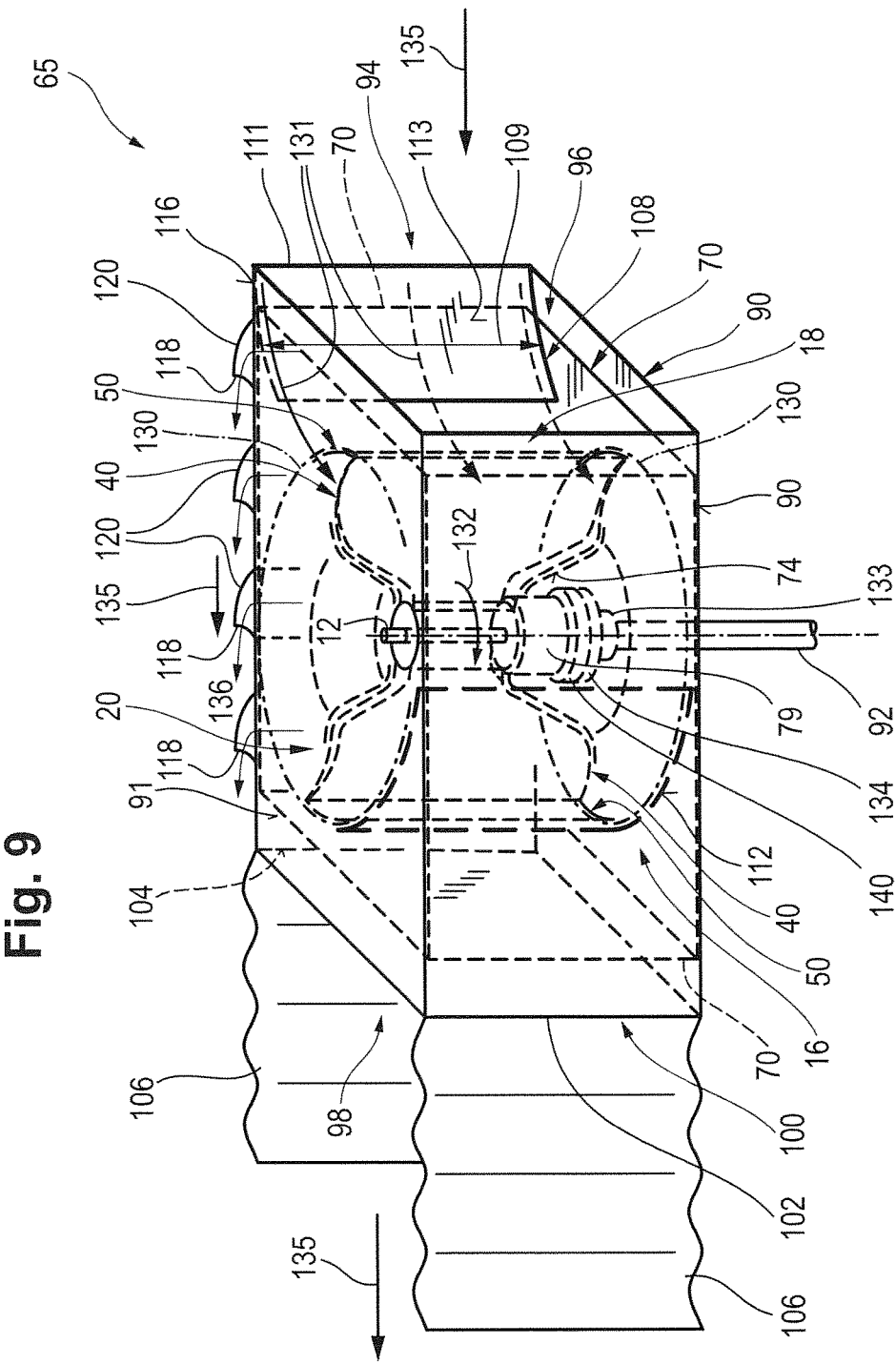
FIG. 9 shows a three-dimensional, second view of a wind turbine according to the fifth example.

FIG. 8 shows a wind turbine 65 with an outer housing 90 according to a fifth example of the present invention in a three-dimensional, first view, and FIG. 9 shows the wind turbine according to the fifth example in a three-dimensional, second view. The first view according to FIG. 8 corresponds to a plan view, wherein the side of the outer housing 90 facing out of the drawing plane corresponds to a top 91 of the outer housing 90. The second view according to FIG. 9 is a side view of the outer housing 90. In the example shown in FIGS. 8 and 9, the first housing 70 is arranged within the cuboid outer housing 90, and the outer housing 90 is mountable on a vertical support mast 92 (FIG. 9), which is parallel to the rotation axis 12 of the rotor 16, by means of, for example, a sleeve 133 and a flange 134. The outer housing 90 is rotatable relative to the support mast 92. The outer housing 90 has a first opening 96 at a first cuboid side 94 extending in parallel to the rotation axis 12, which functions as a wind inlet, and has a second opening 100 as a wind outlet on a second cuboid side 98 opposite the first cuboid side 96. The first and/or second opening 96, 100 can occupy each of the first and second cuboid sides 94, 98, respectively, as shown in an exemplary manner in FIGS. 8 and 9, or can occupy, for example, only a rectangular or circular partial area of the first and second cuboid sides 94, 98, respectively. The outer housing 90 preferably protrudes beyond the inner housing 70 in the area of the wind inlet and outlet.

By arranging the outer housing 90 on the support mast 92 in a rotatable manner it can turn in the wind flow in a manner similar to a weathervane without motive force, so that the wind flow impinges on the rotor blades 18, 20 through the first cuboid side 94. In the example shown here, two rotor blades 18, 20 are shown. However, the rotor 16 can also comprise three, four, five or more rotor blades, as an alternative.

In the example shown in FIGS. 8 and 9, a flag element 106 is arranged on the second cuboid side 98, on each of the edges 102, 104 extending in parallel to the rotation axis 12 of the rotor 16. This enables even better alignment of the outer housing 90 with the wind flow. In alternative embodiments, a flag element 106 can be arranged on only one of the two edges 102, 104, or can be arranged on one or both of the edges, which extend vertical to the rotation axis 12 of the rotor 16. The flag element 106, instead of having a one-part configuration, can also have a multi-part configuration, wherein the individual parts of the flag element 106 are distributed along each of the edges 102, 104 of the second cuboid side 98.

In the exemplary embodiment of FIGS. 8 and 9, a baffle element 108 is arranged in the area of the wind inlet of the outer housing 90. The baffle element 108 has a height 109 essentially corresponding to the height of the first cuboid side 94 parallel to the rotation axis 12 of the rotor 16. The baffle element 108 extends from a lateral edge 111 of the first cuboid side 94, which extends in parallel to the rotation axis 12 of the rotor 16, and has a slightly curved extension from the plane of the first cuboid side 94 toward the interior of the outer housing 90, wherein the concave side 113 of the baffle element 108 faces the outside, i.e. towards the plane of the first cuboid side 94. In this way, most of the wind flow is guided onto the rotor blade 18, 20 moving in operation in the preferred direction of rotation of the rotor 16 in the first direction 63 in the direction of the wind flow, and the rotor blade 18, 20 moving in operation in the preferred direction of rotation of the rotor 16 in the second direction 64 against the wind flow is largely not exposed to the wind flow, since it is shielded by the baffle element 108. The redirection 131 of the wind 135 at the wind inlet is shown by arrows. The baffle element 108 creates a constriction of the wind inlet at the first cuboid side 94 causing the Venturi effect and thus accelerating the wind flow towards the rotor blade 18, 20, which moves in the preferred direction of rotation of the rotor 16 in the first direction 63.

The first, inner housing 70, in the exemplary embodiment shown in FIGS. 8 and 9, comprises a surface element 112 in parallel to the rotation axis 12 connected to the top and bottom 72, 74 of the first housing 70, which is curved corresponding to the rotor disk 130 (FIG. 9) of the rotor blades 18, 20 and arranged in the outer housing 90 at a position diagonal to the baffle element 108. The rotor blade 18, 20 moving in the first direction 63 thus passes the surface element 112 before it moves in the second direction 64 following the direction of rotation 132 of the rotor 16. The pressure of the wind flow is thus maintained on the front side 24 (FIG. 1) of the rotor blade 18, 20, since the wind flow can only escape from the wind outlet once the rotor blade 18, 20 has passed the surface element 112. The direction of rotation 132 corresponds to the preferred direction of rotation of the rotor 16.

In alternative embodiments, only the baffle element 108 or only the surface element 112 can be arranged in the outer housing 90.

In FIG. 8, four fluid openings 118 are arranged on each of the first and second side walls 116, 116' extending in parallel to the rotation axis 12 of the rotor 16, each covered by a fluid guard element 120 on the first side wall 116 and by a fluid intake element 121 on the second side wall 116'. In FIG. 9, the fluid openings 118 covered by fluid guard elements 120 are only indicated on the first side wall 116 for clarity. The fluid guard elements 120 are arranged in such a manner that they form an obtuse angle in the direction of the first cuboid side 94. The wind flow flowing past the fluid openings 118 on the outside of the first side wall 116 of the outer housing 90, shown as wind 135 with an arrow in FIG. 9, creates the Bernoulli effect, thereby sucking air from the inside of the outer housing 90 through the fluid openings 118 and moving it in the direction of the wind flow, i.e. in the first direction 63. This suction flow 136 is shown, for example, by means of arrows in FIG. 9. This reduces the wind resistance of the rotor blade 18, 20 moving in the preferred direction of rotation of the rotor 16 in the second direction 64. The wind flow is accelerated by the fluid guard elements 120 on the first side wall 116 thus amplifying the Bernoulli effect. In alternative embodiments, only one or a plurality of fluid openings 118 can also be arranged on the first side wall 116 without fluid guard elements 120. On the second side wall 116' opposite the first side wall 116, the fluid openings 118 are covered by a fluid intake element 121, which forms an obtuse angle in the direction of the second cuboid side 98. Air is additionally pressed into the outer housing 90 by the fluid openings 118 with the fluid intake elements 121 thus increasing the pressure on the rotor blade 18, 20 moving in the preferred direction of rotation of the rotor 16 in the first direction 63. The or each fluid opening 118, also in combination with a fluid guard element 120 or a fluid intake element 121, as the case may be, can optionally be arranged on other side walls of the outer housing 90, for example to suck air from the outer housing 90 due to the wind flow, or to take more of the air into the outer housing 90. In alternative embodiments, instead of providing four fluid openings 118 on each of side walls 116, 116', only one, two, three, or five or more fluid openings and optionally a corresponding number of fluid guard elements 120 and fluid intake elements 121, can be respectively provided. The fluid openings 118 can also be arranged on only one of side walls 116, 116' and be covered, as needed, by fluid guard elements 120 or fluid intake elements 121. The number of fluid openings and fluid guard elements and fluid intake elements, respectively, do not necessarily have to correspond.

Figure 10:
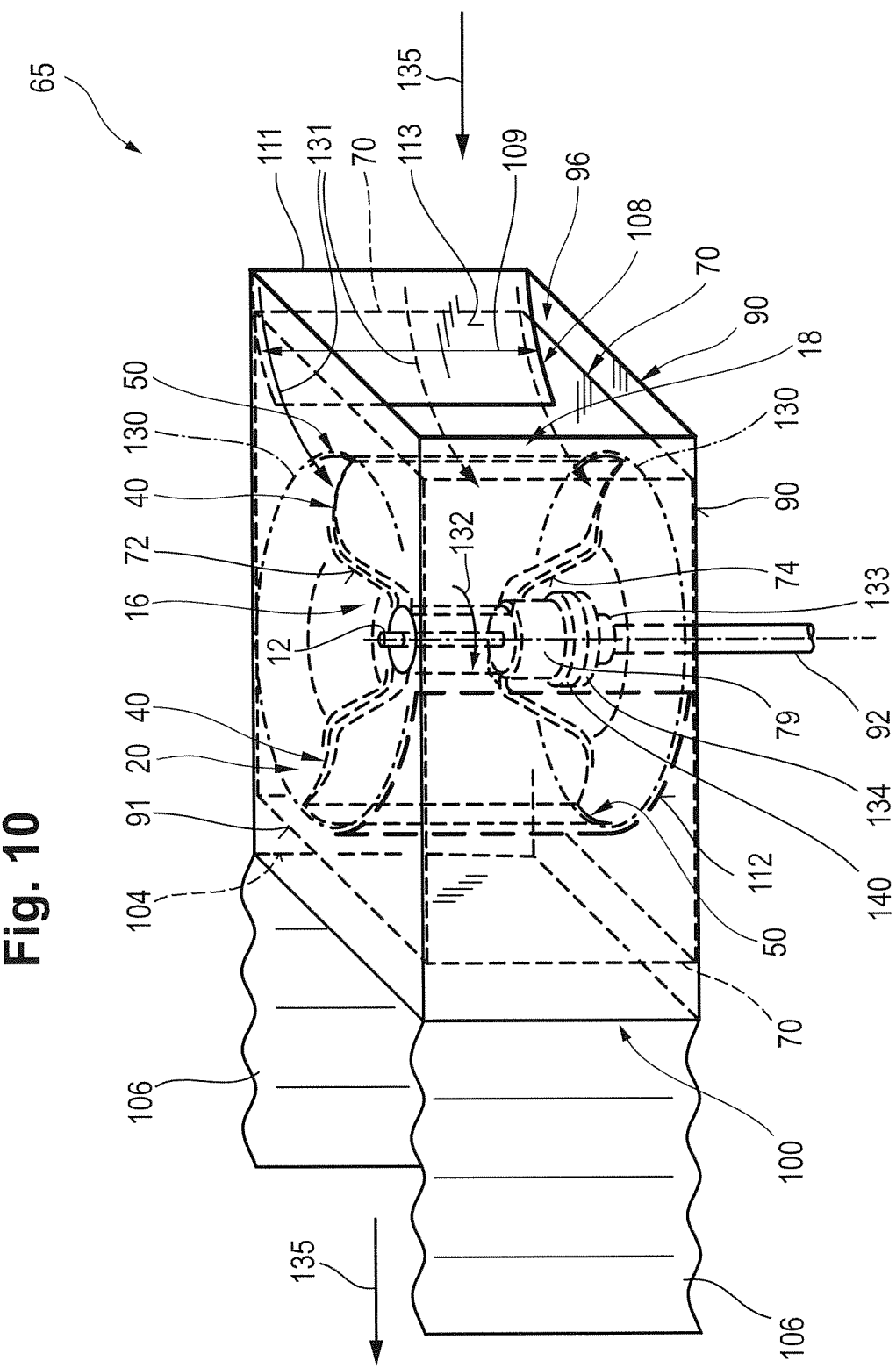
FIG. 10 shows a three-dimensional view of a wind turbine having an outer housing according to a sixth example.

In alternative embodiments, the outer housing 90 can also be formed without fluid openings 118 and/or fluid guard elements 120 and/or fluid intake elements 121, as shown as the sixth embodiment of the present invention in FIG. 10. The wind turbine 65 shown in FIG. 10 corresponds to the wind turbine 65 of FIGS. 8 and 9, just without fluid openings 118 and fluid guard elements 120 and fluid intake elements 121, respectively.

The wind turbines 65 of the fifth and sixth exemplary embodiment are also suitable for operation with a fluid other than air, such as water.

LIST OF REFERENCE NUMERALS 12 rotation axis
16 rotor
18 rotor blade
20 rotor blade
22 rotor blade
24 front side
26 back side
40 first portion
42 concave side
44 convex side
46 end of first portion
47 preferred direction of rotation
48 protruding edge
50 second portion
52 concave side
54 convex side
56 angle
60 opening
61 vane element
62 closure element
63 first direction
64 second direction
65 wind turbine
66 second height
67 second distance
68 first height
69 first distance
70 housing
72 top
73 longitudinal axis
74 bottom
76 second distance
77 cavity
78 first distance
79 generator
80 wing element
81 outer edges
82 fluid slot
83 diameter
84 diameter
85 distance
86 support elements
87 support elements
87' support elements
88 cover element
90 outer housing
91 top
92 support mast
93 rear end of fluid slot
94 first cuboid side
95 first opening
96 second cuboid side
100 second opening
102 edge
104 edge
106 flag element
108 baffle element
111 lateral edge
112 surface element
113 concave side
116 sidewall
116' sidewall
118 fluid opening
120 fluid guard element
121 fluid intake element
122 support element
130 rotor disk
131 redirection of wind flow
132 direction of rotation of rotor
133 sleeve
134 flange
135 wind
136 suction flow
137 upper edge
138 lower edge
139 back side of wing element
140 generator flange
141 upper hub recess
142 lower hub recess

What is claimed is:

1. A rotor, comprising:
   a vertical rotation axis,
   at least two rotor blades arranged on the rotation axis, wherein at least one rotor blade comprises a curved first portion, wherein the first portion has a concave side and a convex side,
   wherein a curved second portion is arranged on an end of the first portion of the rotor blade facing away from the rotation axis, wherein the second portion has a concave side and a convex side, and wherein the two portions are arranged in such a manner that, in the radial direction, the convex side of the first portion is followed by the concave side of the second portion.

2. The rotor according to claim 1, wherein an angle formed between the convex side of the first portion and the concave side of the second portion is smaller than 120°.

3. The rotor according to claim 2, wherein at least one wing element is moveably arranged at an upper edge and/or a lower edge of at least one rotor blade in an area of the first portion, wherein the first portion of the rotor blade comprises at least one opening with an openable closure element.

4. The rotor according to claim 3, wherein at least one vane element is moveably arranged on the convex side of the second portion of the rotor blade, wherein at least one rotor blade has at least a first height at a first distance parallel to the rotation axis and a second height at a second distance parallel to the rotation axis, and wherein the first distance and the first height are smaller than the second distance and the second height, respectively.

5. The rotor according to claim 1, wherein at least one wing element is moveably arranged at an upper edge and/or a lower edge of at least one rotor blade in an area of the first portion.

6. The rotor according to claim 1, wherein the first portion of the rotor blade comprises at least one opening with an openable closure element.

7. The rotor according to claim 1, wherein at least one vane element is moveably arranged on the convex side of the second portion of the rotor blade.

8. The rotor according to claim 1, wherein at least one rotor blade has at least a first height at a first distance parallel to the rotation axis and a second height at a second distance parallel to the rotation axis, wherein the first distance and the first height are smaller than the second distance and the second height, respectively.

9. A fluid turbine, comprising a rotor according to claim 1, wherein the rotor is arranged within a housing,
wherein a top and a bottom of the housing are arranged vertical to the rotation axis,
wherein the rotor is rotatable relative to the housing, wherein the housing has at least a first distance between the top and bottom of the housing at a first distance parallel to the rotation axis and a second distance between the top and bottom of the housing at a second distance parallel to the rotation axis, wherein the first distance parallel to the rotation axis and the first distance between the top and bottom of the housing are smaller than the second distance parallel to the rotation axis and the second distance between the top and bottom of the housing, respectively.

10. The fluid turbine according to claim 9, wherein a distance between the top of the housing and the rotor blades and between the bottom of the housing and the rotor blades is constant.

11. The fluid turbine according to claim 10, wherein at least one fluid slot is arranged at the top and/or the bottom of the housing, wherein the housing is arranged within a cuboid outer housing, wherein the cuboid outer housing is mountable on a vertical support mast and rotatable relative to the support mast,
wherein the rotation axis of the rotor is parallel to the support mast, and
wherein the cuboid outer housing comprises a first opening as a fluid inlet on a first cuboid side extending in parallel to the rotation axis and a second opening as a fluid outlet on a second cuboid side opposite the first cuboid side.

12. The fluid turbine according to claim 11, wherein the cuboid outer housing comprises a flag element on at least one edge of the second cuboid side extending in parallel to the rotation axis of the rotor, and wherein a baffle element is arranged in the fluid inlet.

13. The fluid turbine according to claim 12, wherein the housing comprises a surface element in parallel to the rotation axis and connected to the top and bottom of the housing respectively, which is curved corresponding to the rotor disc of the rotor blades and arranged in the cuboid outer housing at a position diagonal to the baffle element, wherein the cuboid outer housing comprises at least one fluid opening on at least one side wall extending in parallel to the rotation axis of the rotor, and wherein at least one fluid guard element and/or fluid intake element covering the fluid opening is arranged on the side wall, having an obtuse angle in the direction of the first cuboid side and the second cuboid side, respectively.

14. The fluid turbine according to claim 9, wherein at least one fluid slot is arranged at the top and/or the bottom of the housing.

15. The fluid turbine according to claim 9, wherein the housing is arranged within a cuboid outer housing, wherein the cuboid outer housing is mountable on a vertical support mast and rotatable relative to the support mast,
wherein the rotation axis of the rotor is parallel to the support mast,
wherein the cuboid outer housing comprises a first opening as a fluid inlet on a first cuboid side extending in parallel to the rotation axis and a second opening as a fluid outlet on a second cuboid side opposite the first cuboid side.

16. The fluid turbine according to claim 15, wherein the cuboid outer housing comprises a flag element on at least one edge of the second cuboid side extending in parallel to the rotation axis of the rotor.

17. The fluid turbine according to claim 15, wherein a baffle element is arranged in the fluid inlet.

18. The fluid turbine according to claim 17, wherein the housing comprises a surface element in parallel to the rotation axis and connected to the a and bottom of the housing, which is curved corresponding to the rotor disc of the rotor blades and arranged in the outer housing at a position diagonal to the baffle element.

19. The fluid turbine according to claim 17, wherein the cuboid outer housing comprises at least one fluid opening on at least one side wall extending in parallel to the rotation axis of the rotor.

20. The fluid turbine according to claim 19, wherein at least one fluid guard element and/or fluid intake element covering the fluid opening is arranged on the side wall, having an obtuse angle in the direction of the first cuboid side and the second cuboid side, respectively.

* * * * *